United States Patent [19]

Dezaki

[11] 3,794,985

[45] Feb. 26, 1974

[54] REMOTE CONTROL OF A RECEIVER

[75] Inventor: Yoshito Dezaki, Kyoto, Japan

[73] Assignee: Matsushita Electric Industrial Co., Ltd., Osaka-fu, Japan

[22] Filed: May 25, 1972

[21] Appl. No.: 256,773

[30] Foreign Application Priority Data

May 31, 1971 Japan .............................. 46/45473

[52] U.S. Cl. ........................ 340/171 R, 340/148 R

[51] Int. Cl. ............................................ H04q 1/00

[58] Field of Search. 340/171 R; 325/390 R, 392 R, 325/148 R; 178/DIG. 15

[56] References Cited

UNITED STATES PATENTS

| | | | |
|---|---|---|---|
| 2,199,371 | 4/1940 | Goldsmith | 325/390 R |
| 3,103,664 | 9/1963 | Hooper | 178/DIG. 15 |
| 3,235,836 | 2/1966 | Frihart | 325/392 X |
| 3,418,577 | 12/1968 | Fischer | 325/392 X |

*Primary Examiner*—Harold I. Pitts

[57] ABSTRACT

A wireless remote control for a television receiver. The television receiver or controlled system is provided with means for receiving a remote control signal transmitted by a control transmitter. The television receiver may be controlled by said transmitter either if the transmitter is mounted in the television receiver or is removed therefrom.

2 Claims, 5 Drawing Figures

REMOTE CONTROL OF A RECEIVER

BACKGROUND OF THE INVENTION

The present invention relates generally to a wireless remote control system and more particularly, an improvement of the connection between a controlling system and a controlled system.

In the conventional television receiver incorporating an ultrasonic wave remote control system, a transmitter for generating and transmitting the ultrasonic wave remote control signals is provided with a rotary channel selector and other control knobs similar to those provided in the television receiver so that the latter may be controlled by the manual operation of the channel selector and be remote-controlled by the controll knobs on the transmitter. The television receiver is almost manually controlled by a viewer sitting close to the television receiver so that the chance of the television receiver being remote-controlled is less, so that the remote control signal transmitter is not used to the best advantage of its intended purpose in practice.

SUMMARY OF THE INVENTION

Briefly stated, the present invention provides a remote control for television receivers or the like in which opposed to the conventional remote-controlled television receiver or the like, the channel selector and other control knobs or the like are provided only on the remote control signal transmitter, which may be mounted into the television receiver when the remote control is not required, so that the television receiver may be always controlled by the manual operation of the channel selector and the other control knobs or the like on the transmitter.

One of the objects of the present invention is to provide a remote control in which a controlled system may be controlled by the manual operation of the control switches and knobs on a remote control signal transmitter and which is simple in construction and compact in size.

Another object of the present invention is to provide an ultrasonic wave remote control in which a microphone in a controlled system is moved toward the front side of the controlled system when an ultrasonic wave remote control signal transmitter is removed out of the controlled system in order to facilitate the reception of the remote control signals by the microphone.

Another object of the present invention is to provide a remote control in which a remote control signal transmitter has a rechargeable battery as a power source, and is supplied with the DC power from a power source of a controlled system, through suitable electrical coupling means between the transmitter and the controlled system, when the transmitter is mounted into the controlled system.

Another object of the present invention is to provide a remote control in which a controlled system has a battery charger so that when a remote control signal transmitter is mounted into the controlled system, a rechargeable battery in the transmitter may be charged by the battery charger provided in the transmitter system.

Another object of the present invention is to provide an ultrasonic wave remote control in which an ultrasonic wave remote control signal transmitter and a space provided in a controlled system for receiving the transmitter therein are provided with suitable, guide means so that a speaker of the transmitter may be in opposed relation with a microphone of the controlled system when the transmitter is received into the space of the controlled system.

DESCRIPTION OF THE PREFERRED EMBODIMENT

Figure 1:
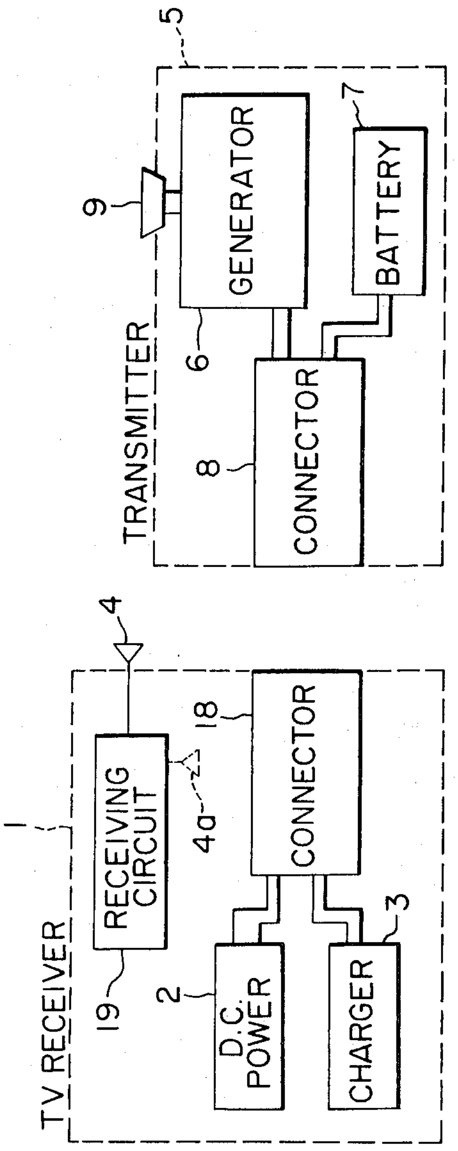
FIG. 1 is a block diagram of a remote control in accordance with the present invention applied to a television receiver.

First referring to FIG. 1, a television receiver generally denoted by a block 1, a DC power source 2, a charger 3 with an overcharge preventive device, microphones 4 or 4*a*, and a receiver circuit 19 which generates control signals in response to the output signals from the microphone 4. The microphone 4 is used when a transmitter 5 to be described in more detail hereinafter is not mounted upon the television receiver 1 whereas the microphone 4*a* is used when the transmitter 5 is mounted upon the television receiver 1. The transmitter generally designated by 5 comprises an ultrasonic wave remote control signal generator 6, a rechargeable battery 7, a connector to be coupled to a connector 18 on the side of the television receiver 1, and a loudspeaker 9.

Figure 2A:
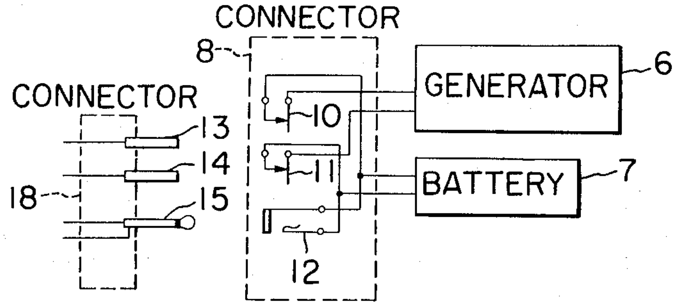
FIG. 2A is a diagrammatic view illustrating the relation between a connector on the side of a remote control signal transmitter and a connector on the side of the television receiver when the former is not mounted on the latter.
Figure 2B:
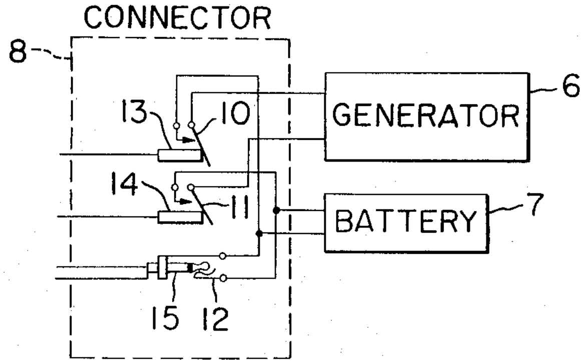
FIG. 2B is a diagrammatic view illustrating the relation between the connectors of the transmitter and the television receiver when the former is mounted onto the latter.

The details of the connectors 8 and 18 are best shown in FIG. 2. FIG. 2A shows the connectors 8 and 18 when they are not electrically connected to each other, whereas FIG. 2B, when they are connected to each other. The connectors 8 and 18 are connected to each other with plugs 13, 14 and 15 on the side of the connector 18 and jacks 10, and 11 and 12 on the side of the connector 8 so that the currents from the DC power source and the battery charger in the television receiver may be supplied to the ultrasonic generator 6 and to the battery 7 in the transmitter 5, respectively.

Figure 3A:
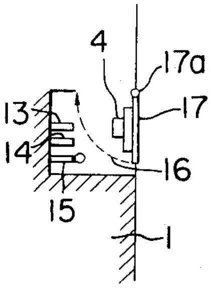
FIG. 3A is a schematic sectional view of a space provided in the television receiver for receiving therein the transmitter, the latter being not mounted.
Figure 3B:
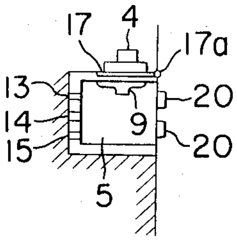
FIG. 3B is a schematic sectional view of the space into which is mounted or inserted the transmitter.

When the transmitter 5 is not mounted into a mounting space 16 in the television receiver 1 as shown in FIG. 3A, a cover or door 17 upon which is disposed the microphone 4, closes the transmitter mounting space 16. The cover or door 17 is hinged to the television receiver 1 with a hinge 17*a*. When the transmitter 5 is mounted in the space 16, the door 17 is retracted as shown in FIG. 3B. The transmitter 5 is controlled by an on-off power switch and a control knob both of which are denoted by reference numeral 20.

Next the mode of operation of the remote control device will be described. In the remote control mode, the connectors 8 and 18 are disconnected as shown in FIGS. 2A and 3A, and the terminals of the jacks 10 and 11 are closed so that the current flows from the battery 7 to the ultrasonic wave generator 6 through the jacks 10 and 11. When the viewer controls the ultrasonic wave remote control signal generator 6 with the switch and the control knob 20, the ultrasonic wave control signal is radiated from the speaker 9 and is received by microphone 4 on the side of the television receiver 1. The received ultrasonic wave signal is converted into the electrical signal and is applied to the receiving circuit 19 which in turn generates the required control signals to be applied to the television receiver 1. As shown in FIG. 3A, the microphone 4 is located on the front side of the television receiver 1 in the remote control mode so that the ultrasonic wave control signal transmitted from the transmitter 5 may be directly received.

When the transmitter 5 is mounted into the space 16 as shown in FIG. 3B, the connectors 8 and 18 are connected to each other as shown in FIG. 2B through the plugs 13, 14 and 15 which are received into the jacks 10, 11 and 12, respectively. The terminals of the jacks 10 and 11 are opened so that the battery 7 is disconnected from the ultrasonic wave generator 6 to which is now supplied the DC power from the DC power source 3 in the television receiver through the plugs 13 and 14 and the jacks 10 and 11. In like manner, the battery charger 3 in the television receiver is connected through the plug 15 and the jack 12 to the battery 7 so that the latter may be charged. Since the battery charger 3 is provided with the overcharge preventive device, the battery 7 may be prevented from breakdown due to the overcharge. The microphone 4 held on the door 17 is retracted to the position shown in FIG. 3B in opposed relation with the speaker 9 of the transmitter 5 mounted into the space 17. Since the space 17 is closed with the transmitter 5, the noise or the ultrasonic wave signals may be prevented from reaching the microphone 4 so that the erratic operation may be positively prevented. The control of the television receiver 1 when the transmitter 5 is mounted therein may be effected by the switch and the control knob 20 on the transmitter 5. In response to the operation of the control knob 20, the desired ultrasonic wave control signal is generated in the ultrasonic generator 6 and is transmitted from the speaker 9 and is received by the microphone 4. The ultrasonic wave control signal received by the microphone 4 is converted into the electrical signal which is applied to the receiving circuit 6 which in turn generates the control signal to be applied to the television receiver 1. Thus, the television receiver may be controlled as desired.

As described above, according to the present invention, all of the operations of the television receiver may be effected by the transmitter so that the on-off power switch, the channel selector or the like which are generally disposed on the front side of the conventional television receiver may be eliminated. Therefore, it is not required to place the channel selector, the volume control, the on-off power switch and the like on the front panel of the television receiver with the cables extended from the chassis thereof, but they may be mounted directly on the chassis. In the conventional large-sized television receiver, the channel selector must be located on the front panel of the television receiver, so that the tuner must be installed also on the rear surface of the front panel and connected to a local oscillator circuit mounted on the chassis through a long cable, so that the problem of the high frequency interference and other problems of the deterioration of the desired characteristics of the television receiver tend to occur very often. However, according to the present invention, these problems may be overcome because it is not required to install the tuner on the front panel of the television receiver. Since the on-off power switch, the volume control and the like which are generally mounted on the front panel of the conventional television receiver may be eliminated in accordance with the present invention, the television receiver may be made simple in construction, compact in size and inexpensive in cost. A further advantage of the present invention is that unless the transmitter is mounted into the television receiver, the latter will not be operated at all at the front panel of the television receiver, so that a baby may be prevented from playing with the television receiver. In case that it is not required to control all of the operations of the television receiver by the remote control device, the operations which may be remote-controlled may be limited to, for example, the channel selection, the volume control and the on-off power switch.

In the instant embodiment, the ultrasonic wave signals are used to control the television receiver, but it should be understood that the present invention may also use the optical, electrical and audible wave control signals when the transmitter and the receiver are arranged so as to be connected and disconnected in accordance with the present invention.

Furthermore, in order to simplify the construction of the embodiment of the remote control device, the battery charger on the side of the television receiver may be eliminated so that when the transmitter is mounted into the television receiver, only the DC power supply to the ultrasonic wave control signal generator may be switched from the battery to the DC power source in the television receiver. In order to further simplify the construction of the remote control device, the ultrasonic wave control signal generator in the transmitter may be operated only on the battery so that only the speaker may be placed in opposed relation with the microphone when the transmitter is mounted into the television receiver.

In one variation of the remote control device in accordance with the present invention, two microphones may be provided in such a manner that one microphone installed on the front panel may be energized when the transmitter is not mounted whereas the other microphone installed within the television receiver may be in opposed relation with the speaker of the transmitter and energized when the transmitter is mounted into the television receiver.

In order to facilitate the precise registration between the speaker and the microphone and the positive electrical coupling between the connectors 8 and 18, the jacks and the plugs may be used as guide means or the suitable guide means may be provided in the transmitter mounting space 16 and on the transmitter 5. This arrangement also serves to prevent the transmitter or the like other than the inherent special transmitter from being inserted into the mounting space in the television receiver. Furthermore, the battery in the transmitter may be eliminated when the DC current is supplied to the transmitter through a rectifier from an AC power source other than in the television receiver. For example when the television receiver is placed at a place near the ceiling so that the channel selection tuner and the like are not easily accessible, the DC power may be supplied to the transmitter through a rectifier from a near-by AC power source.

So far the remote control device in accordance with the present invention has been described as being applied to the television receiver, but it should be understood that it may be also to other devices which are desired to be remote-controlled.

What is claimed is:

1. A remote control device comprising a. a transmitter provided with means for generating and radiating remote control signals; and b. a controlled system comprising a space for mounting therein said transmitter, a door which normally closes the opening of said space, but is retracted inwardly when said transmitter is mounted in said space, a microphone for receiving radiations from said transmitter and mounted on said door in such a manner that said microphone is in opposed relation with said remote control signal generating and radiating means of said transmitter when said transmitter is mounted in said space, and faces outwardly when said door closes the opening of said space.

2. A remote control device as set forth in claim 1 wherein said transmitter is provided with a first DC power source for energizing said remote control signal generating and radiating means, and said controlled system is provided with a second DC power source so that said remote control signal generating and radiating means of said transmitter is supplied with the DC power from said second DC power source in said controlled system when said transmitter is mounted in said space.

* * * * *